United States Patent
Hammad et al.

(10) Patent No.: US 9,718,046 B2
(45) Date of Patent: Aug. 1, 2017

(54) BIMETALLIC TITANIA-BASED ELECTROCATALYSTS DEPOSITED ON IONIC CONDUCTORS FOR HYDRODESULFURIZATION REACTIONS

(75) Inventors: Ahmad D. Hammad, Dharan (SA); Esam Zaki Hamad, Dharan (SA); George Panagiotou, Rio-Patras (GR); Christos Kordulis, Patras (GR); Demetrios Theleritis, Rio-Patras (GR)

(73) Assignee: Saudi Arabian Oil Company, Dhahram (SA)

( * ) Notice: Subject to any disclaimer, the term of this patent is extended or adjusted under 35 U.S.C. 154(b) by 394 days.

(21) Appl. No.: 13/114,156

(22) Filed: May 24, 2011

(65) Prior Publication Data
US 2012/0298503 A1   Nov. 29, 2012

(51) Int. Cl.
| | |
|---|---|
| B01J 21/06 | (2006.01) |
| B01J 23/882 | (2006.01) |
| B01J 37/02 | (2006.01) |
| B01J 37/06 | (2006.01) |
| B01J 37/34 | (2006.01) |
| H01M 8/0662 | (2016.01) |

(52) U.S. Cl.
CPC .......... *B01J 21/063* (2013.01); *B01J 23/882* (2013.01); *B01J 37/0213* (2013.01); *B01J 37/0236* (2013.01); *B01J 37/0242* (2013.01); *B01J 37/0244* (2013.01); *B01J 37/06* (2013.01); *B01J 37/347* (2013.01); *H01M 8/0675* (2013.01)

(58) Field of Classification Search
CPC .............. C08F 4/025; B01J 2531/46

USPC ................. 205/335; 502/154, 152
See application file for complete search history.

(56) References Cited

U.S. PATENT DOCUMENTS

| | | | |
|---|---|---|---|
| 4,329,208 A | 5/1982 | Vayenas et al. | |
| 5,051,156 A | 9/1991 | Scharifker et al. | |
| 6,194,623 B1 | 2/2001 | Frenzel et al. | |
| 6,332,968 B1* | 12/2001 | Mazanec et al. | 205/334 |
| 6,733,909 B2 | 5/2004 | Ding et al. | |
| 7,538,066 B2 | 5/2009 | Soled et al. | |
| 7,776,205 B2* | 8/2010 | Soled et al. | 208/5 |
| 8,383,543 B2* | 2/2013 | Maesen et al. | 502/154 |
| 2002/0164507 A1 | 11/2002 | Ding et al. | |
| 2003/0010269 A1 | 1/2003 | Schirmer et al. | |
| 2003/0165727 A1 | 9/2003 | Priestnall et al. | |
| 2004/0040890 A1 | 3/2004 | Morton et al. | |
| 2004/0058203 A1 | 3/2004 | Priestnall et al. | |
| 2006/0131179 A1 | 6/2006 | Cavalca | |
| 2006/0249429 A1 | 11/2006 | Iki et al. | |

(Continued)

FOREIGN PATENT DOCUMENTS

| | | |
|---|---|---|
| JP | 6106061 | 4/1994 |
| JP | 6198185 | 7/1994 |
| JP | 2005285665 | 10/2005 |

OTHER PUBLICATIONS

Ertl et al; "Electrochemical Modification of Catalytic Activity"; Handbook of Heterogeneous Catalysis; vol. 4; 2008; pp. 1905-1935.

(Continued)

*Primary Examiner* — Zulmariam Mendez
(74) *Attorney, Agent, or Firm* — Abelman, Frayne & Schwab

(57) ABSTRACT

This invention relates to a method for preparing a bimetallic titania-based catalyst for use in hydrodesulfurization reactions.

10 Claims, 3 Drawing Sheets

(56) References Cited

U.S. PATENT DOCUMENTS

| | | |
|---|---|---|
| 2009/0145808 A1 | 6/2009 | Choi et al. |
| 2009/0230026 A1 | 9/2009 | Choi et al. |
| 2010/0105548 A1 | 4/2010 | Zhang et al. |

OTHER PUBLICATIONS

Tewari et al; "Temperature Dependence of Point of Zero Charge of Cobalt and Nickel Oxides and Hydroxides"; Journal of Colloid and Interface Science, vol. 55, No. 3, Jun. 1976, pp. 531-539.
C.G. Vayenas et al; "Dependence of catalytic rates on catalyst work function"; Nature vol. 343, No. 6259, pp. 625-627, 1990.
B.Scheffer et al.; "Sulfidability and Hydrodesulfurization Activity of Mo Catalysts Supported on Alumina, Silica, and Carbon"; Journal of Catalysis 112, 516-527 (1988).
Maria B. Guemez et al.; Effect of fluorine on hydrodenitrogenation activity of doubly promoted (Zn+Co) molybdena-alumina catalysts; Fuel 1995 vol. 75 No. 2, pp. 285-290.
C.A. Cavalca et al.; "Solid Electrolytes as Active Catalyst Supports: Electrochemical Modification of Benzene Hydrogenation Activity on Pt/β"(Na)Al2O3; Journal of Catalysis 177, 389-395 (1998).
Guo-Qiang Lu et al; "Heterogeneous electrocatalysis: a core field of interfacial science"; Current Opinion in Colloid & Interface Science 5 (2000) 95-100.
K. Bourikas et al.; "Adsorption of Molybdate Monomers and Polymers on Titania with a Multisite Approach"; J. Phys. Chem. B 2001, 105, 2393-2403.
Ian S. Metcalfe; "Electrochemical Promotion of Catalysis II: The Role of a Stable Spillover Species and Prediction of Reaction Rate Modification"; Journal of Catalysis 199, 259-272 (2001).
C.G. Vayenas et al.; "Rules and Mathematical Modeling of Electrochemical and Chemical Promotion, 1. Reaction Classification and Promotional Rules"; Journal of Catalysis, 203, 329-350 (2001).
J. Nicole et al.; "Electrochemical Promotion and Metal-Support Interactions"; Journal of Catalysis; 204, 23-34 (2001).
Michele Breysse et al; "Overview of support effects in hydrotreating catalysts"; Catalysis Today 86 (2003); pp. 5-16.
G. Murali Dhar; "Mixed oxide supported hydrodesulfurization catalysts—a review"; Catalysis Today 86 (2003); pp. 45-60.
John Vakros; "Modification of the preparation procedure for increasing the hydrodesulfurisation activity of the CoMo/λ-alumina catalysts"; Catalysis Today 127 (2007); pp. 85-91.
Yasuaki Okamoto; "A novel preparation-characterization technique of hydrodesulfurization catalysts for cleaner fuels"; Catalysis Today 132 (2008); pp. 9-17.
V.M. Kogan et al.; "On the dynamic model of promoted molybdenum sulfide catalysts"; Catalysis Today 149 (2010); pp. 224-231.

* cited by examiner

US 9,718,046 B2

BIMETALLIC TITANIA-BASED ELECTROCATALYSTS DEPOSITED ON IONIC CONDUCTORS FOR HYDRODESULFURIZATION REACTIONS

FIELD OF THE INVENTION

The present invention relates generally to the removal of sulfur from hydrocarbon streams and, more particularly, to a catalytic hydrodesulfurization process which allows for the in situ control of catalyst activity and selectivity.

BACKGROUND OF THE INVENTION

The passage of time has seen the enactment of ever more stringent regulations by governmental authorities based on the need to control and limit sulfur emissions from vehicle exhaust. This requires the petroleum industry to continually improve and upgrade their refinery processes to decrease the quantity of sulfur present in gasoline. Many countries around the world currently limit the allowable sulfur content to less than 50 ppm, and in some cases, as low as 20 ppm.

In many of the processes employed in the petroleum industry, hydrogen is reacted with organic hydrocarbon feedstocks in order to achieve certain desired objectives. For example, in hydrocracking it is sought to maximize the distillable fractions in oil, or its fractions. In hydrodesulfurization (HDS), the aim is the reduction of the sulfur content.

In the aforementioned processes, hydrogen is reacted with the hydrocarbon in a chemical reactor containing a catalyst. The catalyst enhances the process by increasing the reaction rate and also increasing the selectivity of the desired reaction.

Catalytic desulfurization is a preferred method for the removal of sulfur from hydrocarbons. Generally, catalytic desulfurization takes place at elevated temperature and pressure in the presence of hydrogen. At the elevated temperatures and pressures, catalytic desulfurization can result in the hydrogenation of other compounds, such as for example, olefin compounds, which may be present in the petroleum fraction which is being desulfurized. Hydrogenation of olefin products is undesirable as the olefins play an important role providing higher octane ratings (RON) of the feedstock. Thus, unintentional hydrogenation of olefin compounds during desulfurization may result in a decreased overall octane rating for the feedstock. If there is significant loss of octane rating during the hydrodesulfurization of the hydrocarbon stream, because of saturation of olefin compounds, the octane loss must be compensated for by blending substantial amounts of reformate, isomerate and alkylate into the gasoline fuel. The blending of additional compounds to increase the octane rating is typically expensive and thus detrimental to the overall economy of the refining process.

Additionally, catalytic hydrodesulfurization can result in the formation of hydrogen sulfide as a byproduct. Hydrogen sulfide produced in this manner can recombine with species present in the hydrocarbon feed, and create additional or other sulfur containing species. Olefins are one exemplary species prone to recombination with hydrogen sulfide to generate organic sulfides and thiols. This reformation to produce organic sulfides and thiols can limit the total attainable sulfur content which may be achieved by conventional catalytic desulfurization.

Alumina is a common support material used for catalyst compositions, but has several disadvantages in the desulfurization of petroleum distillates. Alumina, which is acidic, may not be well suited for the preparation of desulfurization catalysts with high loading of active catalytic species (i.e., greater than 10 weight %) for catalytically cracked gasoline. Acidic sites present on the alumina support facilitate the saturation of olefins, which in turn results in the loss of octane rating of gasoline. Additionally, recombination of the olefin with hydrogen sulfide, an inevitable result of hydrodesulfurization, produces organic sulfur compounds. Furthermore, basic species present in the feedstock, such as many nitrogen containing compounds, can bind to acidic sites on the surface of the alumina and the catalyst, thereby limiting the number of surface sites which are available for sulfur compounds for desulfurization. Furthermore, basic species present in the feedstock, such as many nitrogen containing compounds, can bind to acidic sites on the surface of the alumina and the catalyst, thereby limiting the number of surface sites which are available for sulfur compounds for desulfurization. At the same time, nitrogen containing compounds having aromatic rings are easily transformed into coke precursors, resulting in rapid coking of the catalyst. Additionally, high dispersion of the metal is difficult to enhance with an alumina support due to the strong polarity and the limited surface area of the alumina. Exemplary commercially available hydrotreating catalysts employing an alumina support include, but are not limited to, $CoMo/Al_2O_3$, $NiMo/Al_2O_3$, $CoMoP/Al_2O_3$, $NiMoP/Al_2O_3$, $CoMoB/Al_2O_3$, $NiMoB/Al_2O_3$, $CoMoPBl$ $Al_2O_3$, $NiMoPB/Al_2O_3$, $NiCoMo/Al_2O_3$, $NiCoMoP/Al_2O_3$, $NiCoMOB/Al_2O_3$, and $NiCoMoPB/Al_2O_3$, (wherein Co is the element cobalt, Ni is nickel, Mo is molybdenum, P is phosphorous, B is boron and Al is aluminum).

In addition, prior art methods suffer in that the preparation of desulfurization catalysts having high metal loading with high dispersion is generally difficult. For example, many prior art catalysts are prepared by a conventional impregnation method wherein the catalysts are prepared by mixing the support materials with a solution that includes metal compounds, followed by filtration, drying, calcination and activation. However, catalyst particles prepared by this method are generally limited in the amount of metal which can be loaded to the support material with high dispersion, which generally does not exceed approximately 25% by weight of the metal oxide to the support material. Attempts to achieve higher loading of the metal to support materials having a relatively high surface area, such as silicon dioxide, typically result in the formation of aggregates of metallic compounds on the surface of the support. Activated carbon has much higher surface area and weaker polarity than conventional catalyst supports, such as for example, alumina and silica. This provides improved performance in the desulfurization of catalytically cracked gasoline because both olefin saturation and recombination of hydrogen sulfide with the olefin are suppressed over activated carbon support. However, weaker polarity and a relatively high hydrophobicity make activated carbon difficult to load large amount of active metallic species, such as molybdenum oxide.

It can be seen from the foregoing that methods for enhancing the performance of catalysts useful in the removal of sulfur species from petroleum-based products are needed.

SUMMARY OF THE INVENTION

The present invention provides an electrochemical catalytic method for the hydrodesulfurization of a petroleum-based hydrocarbon stream which comprises contacting the petroleum-based hydrocarbon stream with a hydrogen-containing gas in an electrochemical call employing Non Faradic Electrochemical Modification of Chemical Activity, said cell comprising an active metal catalyst working electrode applied to a charge conducting solid electrolyte, which is connected to a counter electrode, and is electrochemically promoted by applying a current or potential between the catalyst and the counter electrode during hydrodesulfurization.

The present invention also, provides a method for the preparation of a bimetallic titania-based catalyst for use in hydrodesulfurization reaction, which comprises a) dissolving a salt of a Group VI metal of the Periodic Table in water and adjusting the pH of the solution to an acidic value;

b) dissolving a titanic compound in the solution of step a) and adjusting the pH of the solution to an acidic value;

c) dissolving a salt of Group VIII metal of the Periodic Table in the solution of step b) and adjusting the pH of the solution to an acidic value;

d) evaporating the solution of step c) at elevated temperature and pressure and collecting a bi-metallic, titania-based solid; and, e) calcining the bi-metallic, titania-based solid at an elevated temperature.

It has been found that in the hydroprocessing of hydrocarbon streams, the reaction rate can be enhanced, beyond the normal catalytic enhancement, by applying an electrical potential or current to the surface of the catalyst. By applying this electrical potential, the electron density on the surface of the catalyst is changed, which results in promoting or increasing the hydroprocessing reaction rate, e.g., the hydrodesulfurization (HDS) rate.

The application of an electrical potential to the surface of a catalyst is referred to as the NEMCA effect (Non-Faradic Electrochemical Modification of Catalytic Activity). The NEMCA effect is a phenomenon wherein the application of small currents and voltage potentials on catalysts in contact with solid electrolytes leads to pronounced, strongly non-Faradic and reversible changes in both catalytic activity and selectivity.

In the hydroprocessing of hydrocarbon streams, particularly hydrodesulfurization, in accordance with the present invention, the NEMCA effect is applied to good advantage. The effect is based on the discovery that by applying an electric voltage between, on the one hand, an active material which is applied, preferably in the form of layers, to a solid electrolyte and, on the other hand, a further metallic substrate, also preferably in the form of layers, which is in turn connected to a solid electrolyte, it is possible to increase the activity (rate) and selectivity of a catalyst.

Electrochemical promotion allows for in situ control of catalyst activity and selectivity by controlling in situ the promoter coverage via potential application.

In traditional catalytic processes, classical promoters are used, which typically are added during catalyst preparation, to activate a catalytic process. Another option is the use of metal-support interactions, which activates the catalytic function by using an active support. Neither of these approaches, however, provides accurate and on-demand dosage of promoters during reaction conditions.

The use of NEMCA technology allows for the precise dosing of electropromoters to a catalyst surface during reaction conditions by adjusting the flux of ions (promoters) to the catalyst surface by controlling the applied current or voltage to the cell.

Thus, in one embodiment, a method for the hydrodesulfurization of a petroleum based hydrocarbon distillate of crude oil is provided that includes the step of contacting the petroleum hydrocarbon distillate with hydrogen gas in the presence of a catalyst which has been electrochemically enhanced by the NEMCA effect.

In another embodiment, a hydrodesulfurization catalyst composition is provided whose rate of activity is enhanced by the NEMCA effect.

In still another embodiment, a method is provided for the preparation of a bi-metallic hydrodesulfurization catalyst.

DETAILED DESCRIPTION OF THE INVENTION

Figure 1:
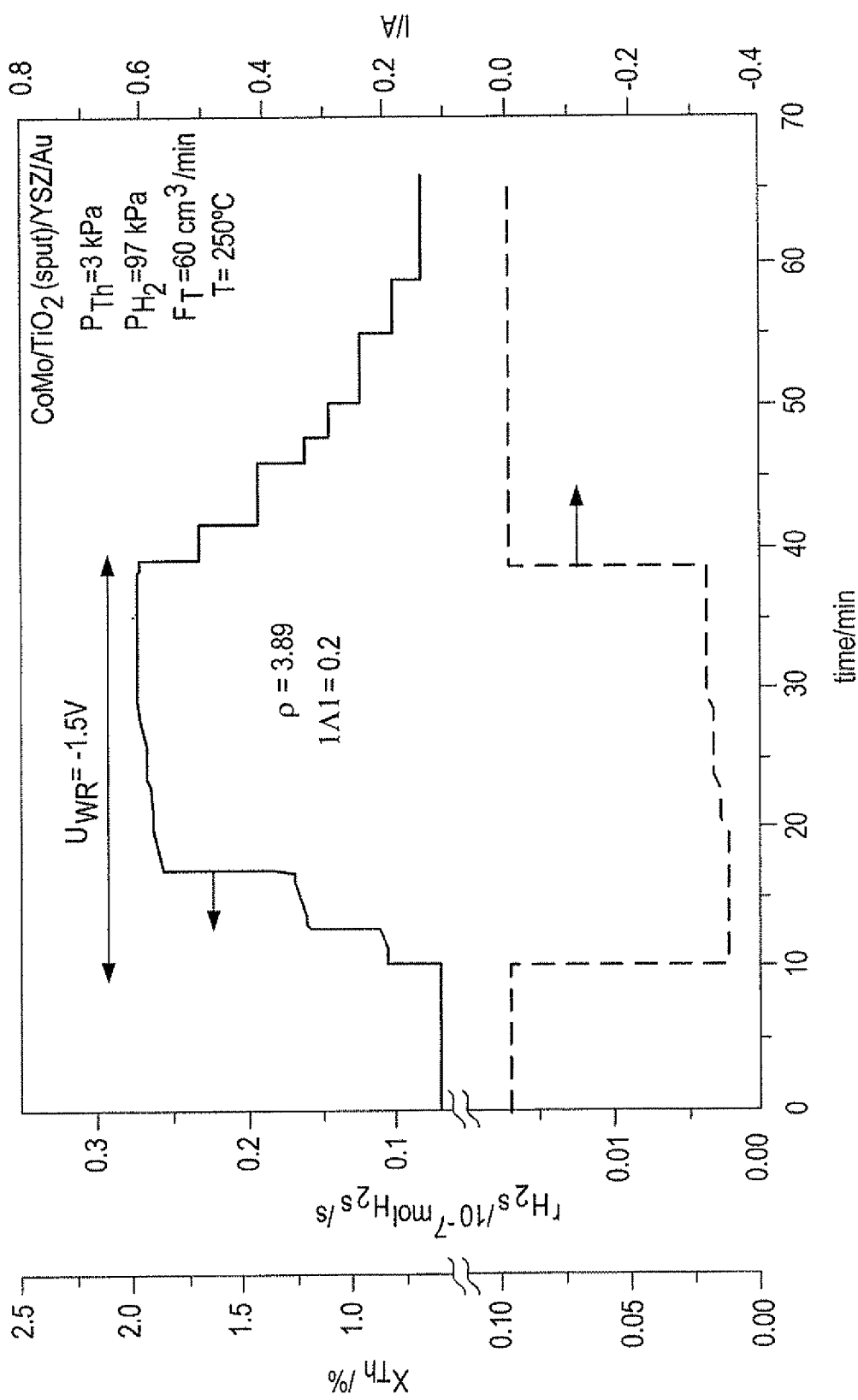
FIG. 1 depicts the transient effect of a constant applied negative potential (−1.5V) on the rate of $H_2S$ formation, the conversion of thiophene and the current. T=250° C., sample: S1.

The NEMCA effect on hydrodesulfurization catalysts can best be described as an electrochemically induced and controlled promotion effect of catalytic surfaces generated by electrolyte charge carrier spillover to/from the electrolyte onto the catalyst surface.

In one embodiment of the present invention, a catalyst composition is provided for the removal of sulfur from petroleum hydrocarbon oils. The catalyst composition is useful in the removal of sulfur from middle distillates produced at distillation temperatures ranging from 200° C. to about 450° C., for example diesel fuel.

In the hydrodesulfurization (HDS) process of the present invention, the catalyst can consist of at least one metal from the metals of Group VIII of the Periodic Table and at least one metal selected from the metals of Group VI of the Periodic Table, which are used as the active metals to be supported on the support.

Examples of the Group VIII metals include cobalt (Co) and nickel (Ni), while examples of the Group VIA metals include molybdenum (Mo) and tungsten (W). The combination of the Group VIII metal and the Group VI metal is preferably Mo—Co, Ni—Mo, Co—W, Ni—W, Co—Ni—Mo, or Co—Ni—W, and most preferably Mo—Co or Ni—Mo.

The content of the Group VI metal in terms of its oxide is preferably in the range of about 1% to 30% by mass, more preferably 3% to 25%, by mass, and most preferably 5% to 20% by mass, based on the mass of the catalyst. If less than 20% by mass is employed, it would not be sufficiently active to desulfurize sufficiently, and if a mass greater than 30% were employed, it would condense resulting in reduced desulfuzation The supporting ratio of the Group VIII metal and the Group VI metal is a molar ratio defined by [Group VIII metal oxide]/[Group VI metal oxide] ranging from 0.105 to 0.265, preferably 0.125 to 0.25, and most preferably from 0.15 to 0.23. A molar ratio of less than 0.105 would result in a catalyst having inadequate desulfurization activity. A molar ratio of greater than 0.265 would result in a catalyst lacking sufficient hydrogenation activity and reduced desulfurization activity.

The total content of the Group VIII metal and the Group VI metal is preferably 22% by mass or greater, more preferably 23% by mass or greater, and most preferably 25% by mass or greater in terms of oxide based on the mass of the catalyst. A mass of less than 22% would result in a catalyst which exerts insufficient desulfurization activity.

The preferred catalyst support for use in accordance with the present invention is titanium dioxide ($TiO_2$). While alumina is the most widely used support material for commercial hydrodesulfurization (HDS) catalysts due to its good mechanical properties, titania based catalysts have been found to be more successful and more suitable when the HDS process is based on electrochemical promotion.

Other supports can also be employed provided they are ion conductors. Exemplary of such supports are alumina, ceria, silica, zirconia, $RuO_2$, CZI and BCN18.

The solid electrolyte supports which can be utilized in the process of the present invention are $O^{2-}$ ionic conductors, exemplary of which is YSZ (8% mol Yttria Stabilized Zirconia) and low temperature (<400° C.) proton conductors, exemplary of which is BCN 18 ($Ba_3$ $CA_{1.18}$ $Nb_{1.82}$ $O_{9-a}$).

Other solid electrolytes include $\beta^{11}$-$Al_2O_3$, $\beta$-$Al_2O_3$, $Li^+$ and $K^+$ conducting $\beta$-$Al_2O_3$.

The level of the voltage applied is usually in the range of ±0.5V to ±2V, preferably about ±1.5V.

As adverted to previously, the phenomenon of electrochemical promotion of catalysis (EPOC or NEMCA effect) has been utilized in the process of the present invention for the in situ modification of the HDS activity of bimetallic Mo—Co catalyst-electrodes at low temperatures and atmospheric pressure.

The phenomenon of electrochemical promotion of catalysis has been investigated using a variety of metal catalysts (or conductive metal oxides), solid electrolyte supports and catalytic reactions. In electrochemical promotion, the conductive catalyst-electrode is in contact with an ionic conductor and the catalyst is electrochemically promoted by applying a current or potential between the catalyst film and a counter or reference electrode, respectively. Numerous surface science and electrochemical techniques have shown that EPOC is due to electrochemically controlled migration (reverse spillover or backspillover) of promoting or poisoning ionic species ($O^{2-}$ in the case of YSZ, $TiO_2$; and $CeO_2$, $Na^+$ or $K^+$ in the case of $\beta''$-$Al_2O_3$, protons in the case of Nafion, CZI ($CaZr_{0.9}In_{0.1}O_{3-\alpha}$) and BCN18 ($Ba_3Ca_{1.18}Nb_{1.82}O_{9-\alpha}$), etc.) between the ionic or mixed ionic-electronic conductor—support and the gas exposed catalyst surface, through the catalyst-gas-electrolyte three phase boundaries (TPBs).

Two parameters are commonly used to quantify the magnitude of the EPOC effect:

1. the rate enhancement ratio, ρ, defined from:

$$\rho = r/r_o \quad (1)$$

where r is the electropromoted catalytic rate and $r_o$ the open-circuit, i.e. normal catalytic rate.

2. the apparent Faradaic efficiency, Λ, defined from:

$$\Lambda = (r - r_o)/(I/nF) \quad (2)$$

where n is the charge of the ionic species and F the Faraday's constant.

A reaction exhibits electrochemical promotion when $|\Lambda| > 1$, while electrocatalysis is limited to $|\Lambda| \leq 1$.

The selectivity of the reaction to the produced hydrocarbon (HC) species has been calculated by $$S_i = r_i / r_{th} \quad (3)$$

where, $r_i$ is the formation rate of each HC product and $r_{th}$ the consumption rate of thiophene, equal to $\Sigma r_i$ within ±2%.

The preferred method for preparing $MoCo/T_1O_2$ for use in accordance with the present invention involves wet impregnation at various pH values. The wet impregnation method was used for the co-deposition of Mo and Co with a ratio of 15 wt % $MoO_3$ to 3 wt % CoO. The addition of 82 wt % $TiO_2$ (anatase) ensures a fine dispersion of the catalyst with only one monolayer of mostly Mo at the surface of the $TiO_2$ matrix. As indicated, wet impregnation can be carried out at different pH values. At more acidic concentrations of the solution (pH=4 or 4.3) the formation of polymeric $Mo_7O_{24}$ is to be expected, while at neutral conditions (pH=6.7), only monomeric $MoO_4$ species will be obtained.

The polymeric species (mainly $[Mo_7O_{24}]_{6-}$ and $[HMo_7O_{24}]_{5-}$) are deposited through electrostatic adsorption on $TiO_2$ surface. The monomeric species (mainly $[MoO_4]_{2-}$) are adhered through the formation of hydrogen bonds and inner sphere complexes. Because the wet impregnation method is used to prepare the catalysts, only a small amount of the species is deposited through the above deposition modes. Thus, the greater amount of the molybdenum species is deposited through bulk deposition. This means that the species are deposited through precipitation during the water evaporation step.

Preparative Example 1

Wet Impregnation Method at pH 4.3

The preparation of the $CoMo/TiO_2$ (pH=4.3) catalyst is performed using the "co-impregnation under EDF conditions" method. According to this method, 0.7361 g ammonium heptamolybdate [$(NH_4)_6Mo7O24*4H_2O$] were dissolved in about 100 ml of triple-distilled water, in a 500 ml round flask. The pH was adjusted to 4.3 by adding concentrated $HNO_3$ solution dropwise. To this solution, 3.495 g of TiO2 were added and due to the Mo adsorption on $TiO_2$ surface and the PZC(=6.5) of the titania used, the pH rose to between 8 and 8.5. To this suspension, 0.52018 g of cobalt nitrate [$Co(NO_3)2*6H_2O$] were then added. Before the addition of the cobalt nitrate salt the pH was adjusted again to 4.3 in order to avoid $Co(NO_3)OH$ precipitation. As the adsorption of cobalt species altered the solution pH to a value of 3.0-3.5, the latter had to be adjusted again to 4.3 using a concentrated ammonia solution ($NH_4OH$).

The round flask containing the suspension was then placed in a rotary evaporator and stirred for about 30 min. After a final adjustment to pH 4.3, the evaporation at T=40-45° C. and pressure 30 mbar was started. When the material was dried, it was transferred in a porcelain crucible and calcined at 500° C. for 2 hours in air. The final composition of the catalyst was 14.2 (10) wt % $MoO_3$ (Mo), 3.2 (2.6) wt % Coo (Co) and 82.6 (87.4) wt % $TiO_2$.

Preparative Example 2

Co-Deposited Catalyst Powder

A few drops of triple-distilled water was added to a small amount of the final powder of the wet impregnation method of Preparative Example 1 to form a thick paste, which was then spread at the surface of the proton ion conductor. The catalyst film was dried at 120° C. for 30 minutes and was then calcined at 500° C. for 2 hours.

Preparative Example 3

Procedure for Preparing Sputtered Mo Films

Thin Molybdenum (Mo) coatings are produced by a de magnetron sputter process. By this process homogeneous, well adhered, thin metal or metal oxide coatings are produced. For the production of such coatings, suitable for electrochemical promotion, several favorable deposition parameters need to be defined.

Deposition Parameter for the Mo Catalyst-Electrodes

The sputtering parameters for the Mo coating on the CIZ electrolyte substrate with a mass of m=0.0001 g are:
p=8.86-10.53 mTorr (~40 ccm Ar)
P=330-403 Watt
I=0.8-1.09 Amp
V=327 Volt
Deposition Time: 10 minutes The sputtering parameters for the Mo coating on the CIZ electrolyte substrate with a mass of m=0.0135 g are:
p=5.57-6.74 mTorr
P-306-390 Watt
I=0.8-1.03 Amp
V=340 Volt
Deposition Time: 40 minutes

Preparative Example 4

Procedure for Preparation of MoCo Deposited on Sputtered Mo Films

A thin layer of Mo was sputtered on the CZI electrolyte and calcined at 500° C. The films were reduced in $H_2$ and presulfation was carried out at 500° C.

The MoCo deposited catalyst was prepared in the following way:

1. To a round bottom flask, 100 ml of triple distilled water was added.
2. 3 g of $(NH_4)_6Mo_7O_{24}*4H_2O$ was added to the 100 ml $H_2O$.

Preparative Example 5

Presulfation

Presulfation of the catalyst-electrolyte assembly was carried out with all catalyst-electrolyte assemblies in Examples I and II in the following manner.

A stream of Ar (20 ml/min) was passed through the reactor, discussed in Preparative Example 8, while the reactor was heated to 500° C. and was maintained for 30 min at 500° C.

A stream of 15 Vol % $H_2S$ and 85 Vol % $H_2$ was supplied to the reactor at 500° C. for 2 hours.

After completing the presulfation, a stream of Ar was supplied for 1 hour at 400° C.

Cooling/heating to the desired reaction temperature.

Preparative Example 6

Two Different Solid Electrolyte Supports were Used:

a. YSZ (8% mol Yttria Stabilized Zirconia), an $O^{2-}$ ionic conductor.

b. BCN18 ($Ba_3Ca_{1.18}Nb_{1.82}O_{9-\alpha}$) a low temperature (<400° C.) proton conductor.

Both of the solid electrolyte pellets had a thickness of 2 mm and diameter of 18 mm.

Preparative Example 7

Preparation of Metal and Metal Oxide Interlayers

Thin Mo and $TiO_2$ layers were deposited over the ionic conductor supports, before the catalyst deposition, to increase the intimate contact or adhesion between the catalyst-electrode, also known as the working electrode, and the support, and to facilitate the migration of the backspillover species onto the catalyst surface. The enhancing role of $TiO_2$ interlayers has been reported in previous EPOC studies, both for oxidation and hydrogenation reactions.

The Mo/electrolyte and $TiO_2$/electrolyte type thin electrodes were prepared by metal sputtering as described previously. A magnetron sputtering system was used. High purity Ar and $O_2$ were used as sputtering and reactive gas, respectively. The discharge characteristics were controlled using a variable DC power supply (1 kV and 2 A). Pure Mo (99.95%) and Ti (99.95%) were used as sputtering targets.

$TiO_2$ thin layers were deposited only over the YSZ substrates with 600 W target power, which enabled a 0.5 nm/min deposition rate and led to a c.a. 90 nm thickness film after 3 hours of deposition. The substrate temperature was stable during the deposition at 250° C. Also, a post-deposition annealing of the deposited $TiO_2$ layer was performed in air at 600° C. for 60 minutes, resulting in a 60% rutile and 40% anatase structure. The $TiO_2$ layers structure characterization has been described previously.

Molybdenum interlayers were deposited in each case holding the target power stable at 280 W, which enabled a 20 nm/min deposition rate, achieving a 100 nm thickness Mo layer after 5 minutes of deposition. The substrate temperature was kept stable at 50° C.

On the other side of the pellets, Au counter and reference electrodes were prepared in each case by application of a metalorganic paste (Metalor, Gold resinate, A1118), followed by drying at 400° C. for 90 minutes and calcination at 650° C. for 30 minutes. Blank experiments using Au also for the working electrode showed that Au is practically catalytically inactive for the HDS reaction, establishing that the observed rate values correspond only to the rate on the catalyst-electrode and not to the counter or reference electrodes. Similar blank experiments with $TiO_2$ powder showed that $TiO_2$ also is inactive under the mentioned conditions.

Preparative Example 8

Reactor Operation

An atmospheric pressure electrochemically promoted single chamber reactor was used equipped with a solid electrolyte pellet, on which three electrodes were deposited, namely, the working-catalyst electrode, the counter electrode and the reference electrode. Gold wires were used for the electrical connections between the electro catalytic element and the external power supply unit. A three-bore, ultra high vacuum feed-through unit, special for high temperature $H_2$ and $H_2S$ environment, was used for the gastight introduction of the gold wires in the reactor. The temperature was measured and controlled by a type-K thermocouple placed in a stainless steel close-end tube in the proximity of the catalyst electrode.

The feed gas composition and total gas flow rate, $F_T$, was controlled by four mass flowmeters (Brooks smart mass flow and controller, B5878). Reactants were Messer-Griesheim certified standards of pure (99.99%) $H_2$ and $H_2S$, while thiophene was introduced using a saturator ($P_{th}^{25°C.}$=3 kPa) with Ar or $H_2$ carrier gas. Pure (99.99%) argon was fed through the fourth flowmeter in order to further adjust total gas flow rate and inlet gas composition at desired levels. $H_2$ partial pressure was held constant at 97 kPa, while thiophene partial pressure could be varied from 0.5 to 5 kPa. The total gas flow rate was constant at 30 and 60 $cm^3$/min. Reactants and products were analyzed by on-line gas chromatography (Shimadzu 10A, equipped with a Porapaq-QS column at 50° C. for the separation of thiophene and the produced $C_xH_y$) in conjunction with a continuous analysis $H_2S$ colorimeter (Applied Analytics Inc.). Constant currents or potentials were applied using an AMEL 2053 galvanostat-potentiostat.

TABLE 1

Electrochemical Cells Used in Examples

| Sample | Cell | Working Electrode | Interlayer | Electrolyte | Counter/ Reference Electrode |
|---|---|---|---|---|---|
| S1 | MoCo/TiO$_2$/YSZ/Au | MoCo (impregnation) | TiO$_2$ (sputtering) | YSZ | Au |
| S2 | MoCo—TiO$_2$/ Mo/YSZ/Au | MoCo/TiO$_2$ (dispersed- impregnation) | Mo (sputtering) | YSZ | Au |
| S3 | MoCo—TiO$_2$/ Mo/BCN18/Au | MoCo/TiO$_2$ (dispersed- impregnation) | Mo (sputtering) | BCN18 | Au |

Example I. The Use of $O^{2-}$ Ionic Conductor Support (YSZ)

As can be seen by an examination of FIG. 1, it shows the transient effect of a constant applied negative potential (−1.5V) on the rate of $H_2S$ formation (reaction (4)), the conversion of thiophene and the current at 250° C., using sample S1, i.e. Mo—Co/TiO$_2$(sp)/YSZ/Au, identified more fully in Table 1 and the preparative examples.

$$C_4H_4S + H_2 \rightarrow C_xH_y + H_2S \qquad (4)$$

As shown, under open circuit, i.e. normal catalytic conditions, the conversion of thiophene is ~0.5%. Negative potential application (−1.5V) causes a 3.9-fold increase of the catalytic rate ($\rho$=3.9), where thiophene conversion reaches ~2%, while the apparent Faradaic efficiency is 0.2. However, in the present instance where oxygen is not present in the gas mixture, any current or potential-induced catalytic rate change suggests electrochemical promotion, even when $|\Lambda|<1$. On the other hand, positive potential application has no effect on the catalytic rate. The electrophilic behavior observed here, i.e. rate increase by electrode potential or work function decrease, appears when the electron acceptor (i.e. thiophene) species is weakly adsorbed on the catalytic surface and the electron donor ($H_2$) strongly adsorbed. This agrees with the positive order dependence of the reaction rate on $P_{th}$, proposed in the literature. Upon the application of negative potential, i.e. $O^{2-}$ pumping from the catalytic electrode, the thiophene-catalyst bond strength increases and causes higher thiophene coverage of the catalytic surface.

After current interruption the catalytic rate reversibly returns to its initial open-circuit steady-state value. This indicates that the surface sulfur species, formed during the sulfation pretreatment step, were not consumed upon negative polarization, which would cause catalyst partial deactivation.

Figure 2:
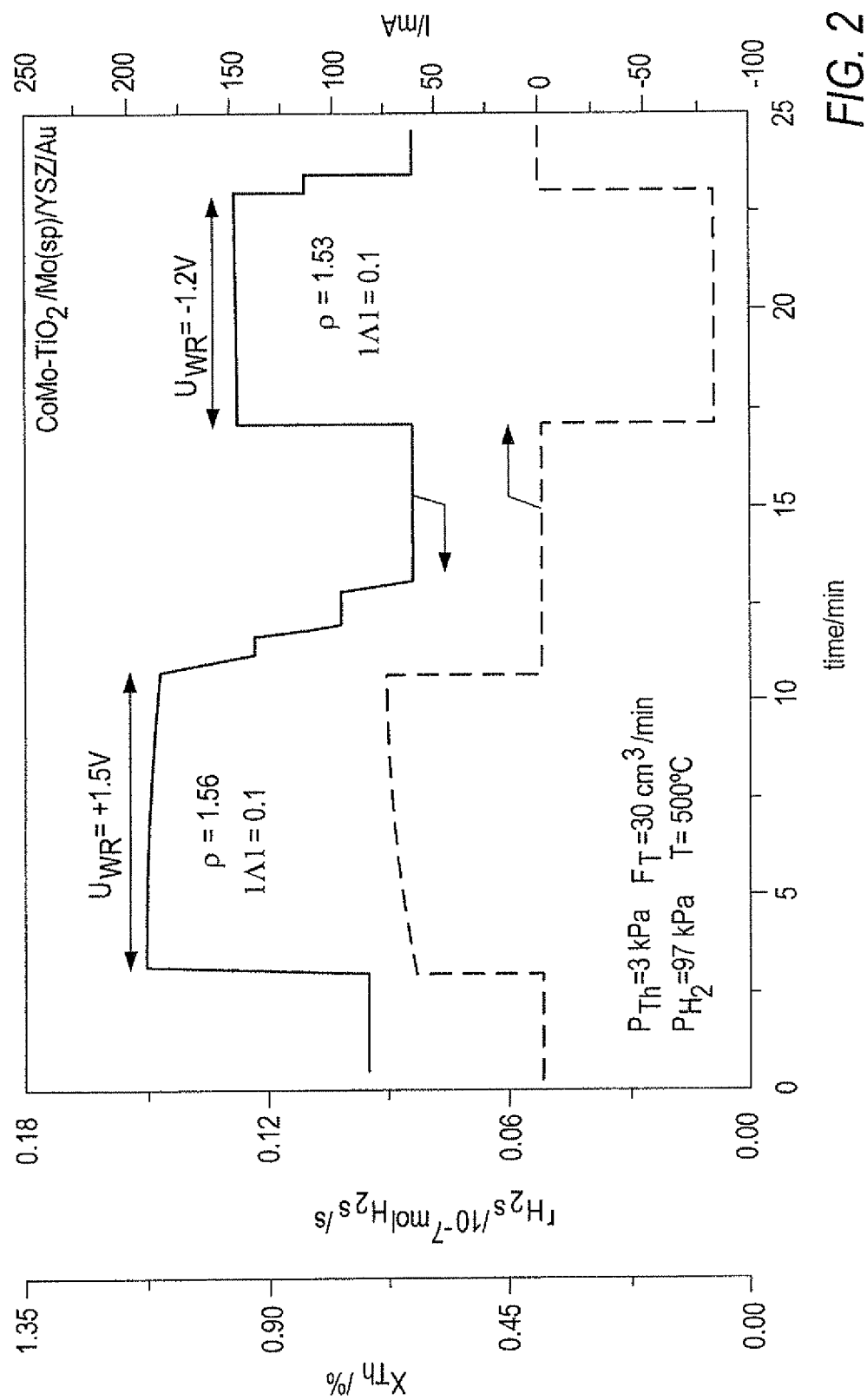
FIG. 2 depicts the transient effect of a constant applied positive (1.5V) and negative (−1.2V) potential on the rate of $H_2S$ formation, the conversion of thiophene and the current. T=500° C., sample: S2.

As can be seen by an examination of FIG. 2, it shows the transient effect of a constant applied positive (1.5V) and negative (−1.2V) potential on the rate of $H_2S$ formation (reaction (4) above), the conversion of thiophene and the current at 500° C., using sample S2 identified more fully in Table 1 and the preparative examples, where the CoMo—TiO$_2$ dispersed catalyst coating is supported over a thin sputter deposited Mo film interfaced with YSZ.

As shown, under open-circuit conditions the conversion of thiophene is ~0.7%, similar to that obtained using sample S1 (FIG. 1) at 250° C. Positive potential application (1.5V) causes an 1.5-fold increase of the catalytic rate, while the apparent Faradaic efficiency is 0.1. This is in contrast to the behavior of sample S1, where positive polarization had no effect on the rate. On the other hand, application of a negative potential (−1.2V) causes a similar less pronounced effect on the rate where $\rho$=1.5, indicating the inverted volcano behaviour of the system. This change from electrophilic to inverted volcano behavior, utilizing similar samples (S1 and S2), S2 is mainly due to the high operating temperature for sample S2. At elevated temperatures both electron acceptor and electron donor species are weakly bonded on the catalytic surface, which results in the observed inverted volcano behavior of FIG. 2. Similar change of the EPOC behaviour by temperature increase has been reported in previous studies on the model reaction of $C_2H_4$ oxidation over Pt/YSZ, where the behaviour changes from electrophobic to inverted volcano.

After positive current interruption, the catalytic rate decreases to a value lower (?) than the initial open-circuit steady-state value, indicating a deactivation of the catalyst.

Example II. The Use of Proton Conductor Support (BCN18)

Figure 3:
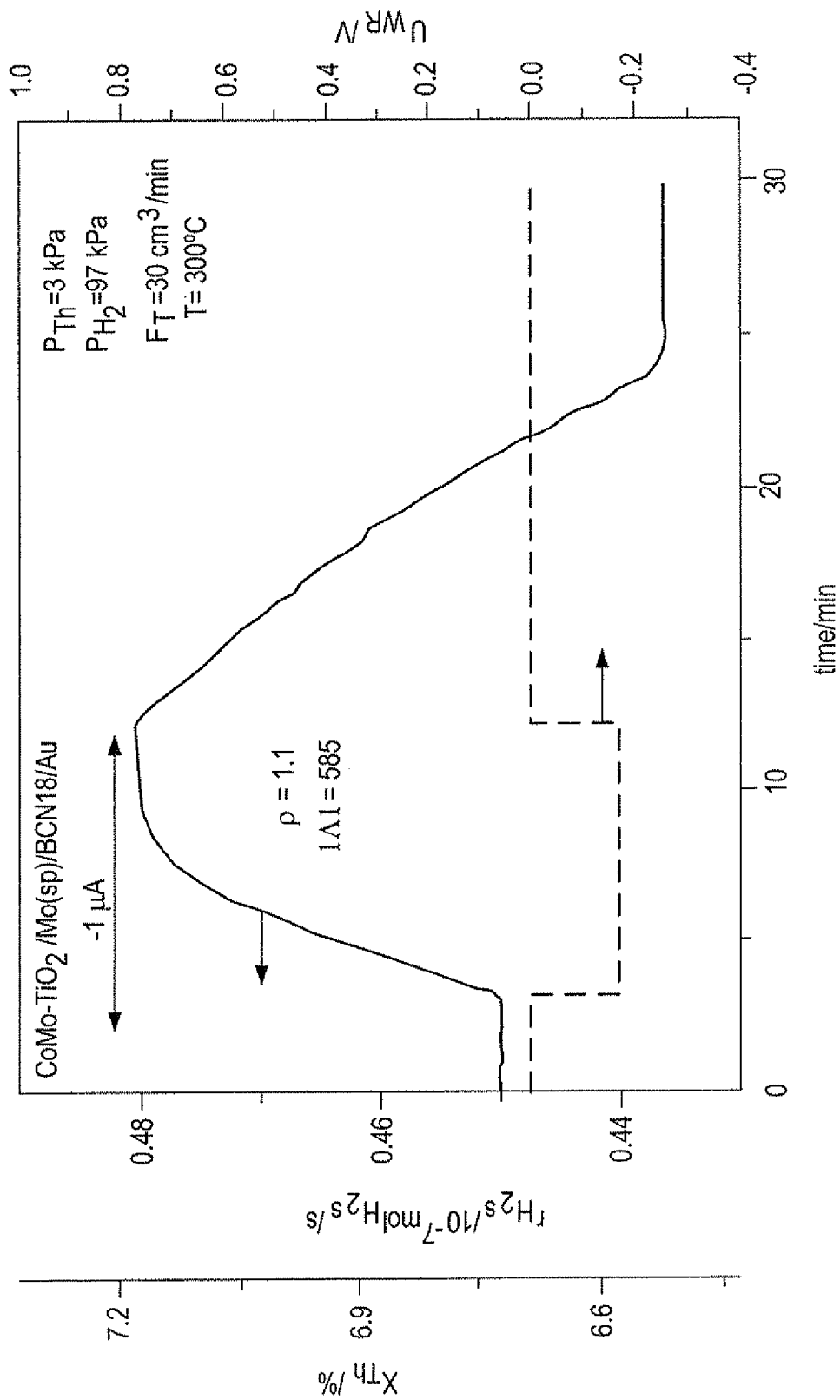
FIG. 3 depicts the transient effect of a constant applied negative current (−1 µA) on the $H_2S$ formation catalytic rate, the conversion of thiophene and the catalyst reference potential difference. T=300° C., sample: S3.

As can be seen by an examination of FIG. 3, it shows the transient effect of a constant applied negative current (−1 μA) on the $H_2S$ formation catalytic rate, the conversion of thiophene and the catalyst electrode—reference potential difference at 300° C. using sample S3, identified more fully in Table 1 and the preparative examples.

As shown, negative current application causes a 10% increase of the catalytic rate ($\rho$=1.1), while the apparent Faradaic efficiency equals 585, i.e. each proton present on the catalyst surface, which establishes an effective double layer, causes the reaction of up to 585 adsorbed from the gas phase hydrogen species. After the negative current interruption, the catalytic rate decreases and stabilizes at a value lower than the initial value. This "poisoning" effect of the negative polarization can be attributed to possible hydrogenation of the catalytically active surface sulfur groups supplied by the backspillover proton species upon negative polarization.

While certain representative embodiments and details have been shown for purposes of illustrating the invention, it will be apparent to those skilled in the art that various changes in the methods and the electrochemical cell disclosed herein may be made without departing from the scope of the invention, which is defined in the appended claims.

What is claimed is:

1. A method of preparing a CoMo/TiO$_2$ catalyst using co-impregnation under Equilibrium Deposition Filtration (EDF), which comprises the sequential steps of:
   a) first dissolving a molybdenum salt in water and adjusting the pH of the solution to an acid value;
   b) followed by dissolving a titania compound in the solution of step a) and adjusting the pH of the solution to an acid value;
   c) followed by dissolving a cobalt salt in the solution of step b) to adsorb said cobalt onto said titania compound with said molybdenum and adjusting the pH of the solution to an acid value;
   d) evaporating the solution of step c);
   e) collecting a CoMo/TiO$_2$ solid; and
   f) calcining the CoMo/TiO$_2$ to form a catalyst.

2. The method according to claim 1, wherein the pH in step a) is adjusted to 4.3.

3. The method according to claim 2, wherein the pH of the solution in step a) is adjusted with HNO$_3$.

4. The method according to claim 1, wherein the pH in step b) is adjusted to 4.3.

5. The method according to claim 4, wherein the pH of the solution in step b) is adjusted to 4.3.

6. The method according to claim 1, wherein the evaporation in step e) is conducted at a temperature of about 40° C. to about 45° C. and at a pressure of 30 mbar.

7. The method according to claim 1, wherein the calcinations in step e) is conducted at about 500° C. for about 2 hours.

8. The method according to claim 1, wherein the final composition of the catalyst is about 14.2 wt. % MoO$_3$, 3.2 wt. % CoO and 82.6 wt. % TiO$_2$.

9. The method of claim 1, wherein the acid value of (a), (b), and (c) is 4.3.

10. The method of claim 1, wherein said Mo salt is ammonium heptamolybdate, said titania compound is TiO$_2$ and said cobalt salt is cobalt nitrate.

* * * * *